United States Patent [19]

Jane et al.

[11] Patent Number: 5,397,834
[45] Date of Patent: Mar. 14, 1995

[54] BIODEGRADABLE THERMOPLASTIC COMPOSITION OF ALDEHYDE STARCH AND PROTEIN

[75] Inventors: Jay-lin Jane; Kris E. Spence, both of Ames, Iowa

[73] Assignee: Iowa State University Research Foundation, Inc., Ames, Iowa

[21] Appl. No.: 116,865

[22] Filed: Sep. 3, 1993

[51] Int. Cl.$^6$ .................. C08G 63/48; C08G 63/91
[52] U.S. Cl. .................. 525/54.1; 525/54.2; 525/54.21; 525/54.24; 525/54.3; 525/54.31
[58] Field of Search ............... 525/54.1, 54.2, 54.21, 525/54.24, 54.3, 54.31; 127/32, 33, 67, 71; 426/138, 512, 516, 656, 661

[56] References Cited

U.S. PATENT DOCUMENTS

| | | |
|---|---|---|
| 3,153,597 | 10/1964 | Weakley et al. |
| 3,169,073 | 2/1965 | Weakley et al. |
| 3,188,233 | 6/1965 | Weakley et al. |
| 3,336,246 | 8/1967 | Golick et al. |
| 3,395,106 | 7/1968 | Curtis . |
| 3,441,526 | 4/1969 | Zilkha et al. |
| 3,687,877 | 8/1972 | Runton . |
| 3,934,587 | 1/1976 | Gordon . |
| 3,949,145 | 4/1976 | Otey et al. |
| 4,001,442 | 1/1977 | Stahlberger ............... 426/105 |
| 4,013,514 | 3/1977 | Wildi et al. ............... 195/68 |
| 4,038,140 | 7/1977 | Jaworek et al. ............ 525/54.1 |
| 4,076,846 | 2/1978 | Nakatsuka et al. ......... 426/62 |
| 4,339,360 | 7/1982 | Shimizu et al. ............ 524/28 |
| 4,355,137 | 10/1982 | Winter ...................... 525/54.1 |
| 4,929,670 | 5/1990 | Billmers et al. ............ 525/54.1 |

FOREIGN PATENT DOCUMENTS 2017124 10/1979 United Kingdom .

OTHER PUBLICATIONS

Mehltretter, "Dialdehyde Starch", *Methods in Carbohydrate Chemistry*, 4, 316–317, R. L. Wistler, ed., Academic Press, Inc. (1964).

Spence et al., "Biodegradable Plastic Made From Oxidized Starch and Zein: A Progress Report", *Proceedings: 1992 Scientific Conference*, Corn Refiners Association, Inc., 195–196 (1992).

Weakley et al., "Irreversible Insolubilization of Casein by Dialdehyde Starch", *Tappi*, 44, 456–459 (1961).

*Primary Examiner*—Nathan M. Nutter
*Attorney, Agent, or Firm*—Merchant, Gould, Smith, Edell, Welter & Schmidt

[57] ABSTRACT

The invention provides biodegradable, thermoplastic compositions made of the reaction product of a starch aldehyde with protein. The resulting products formed with the present compositions possess a smooth, shiny texture, and a high level of tensile strength, elongation, and water resistance compared to articles made from native starch and protein.

29 Claims, No Drawings

BIODEGRADABLE THERMOPLASTIC COMPOSITION OF ALDEHYDE STARCH AND PROTEIN

BACKGROUND OF THE INVENTION

Various formulations of thermoplastic compositions have been developed in an attempt to at least partially replace non-degradable petroleum-based products with biodegradable components which can be used for the manufacture of extruded and/or molded articles such as films, utensils, containers and other packaging articles. Several of these compositions have been formulated with starches. Although starch compositions are biodegradable, they also tend to readily absorb moisture from humid air or by direct contact with water. This causes the moisture content of a molded article to increase and the article to lose its dimensional stability, and tear or collapse.

In an attempt to improve the structural stability of articles made from starch-based compositions, other ingredients have been included in the formulations. For example, compositions have been developed that include starch in combination with a water-insoluble synthetic polymers. Unmodified starches have also been combined with protein to provide moldable, biodegradable thermoplastic compositions. For example, Nakatsuka et al. (U.S. Pat. No. 4,076,846; issued Feb. 28, 1978) discloses an edible binary protein-starch molding composition containing a salt of a natural protein (i.e., casein), an unmodified, high amylose starch material, an edible plasticizer (i.e., sorbitol), and a lubricant (i.e., a fatty acid polyol ester), and having a final water content of about 10–40%. The composition is molded, for example, by extrusion through a die, into an article having a water content of about 5–30 wt-%. A disadvantage of these starch-based plastics is that the molded articles made from such compositions have a high tendency to absorb water, which causes the articles to lose mechanical strength and to disintegrate quickly.

Therefore, an object of the invention is to provide a thermoplastic material made of starch and protein which can be formed into articles that have an increased level of mechanical strength and water-resistance, being capable of tolerating exposure to water over an extended period of time with minimal or no disintegration. It is a further object to provide a thermoplastic material that is biodegradable.

SUMMARY OF THE INVENTION

These and other objects are achieved by the present invention which is directed to a biodegradable thermoplastic composition made of the reaction product of about 10–35 wt-% protein such as zein or soybean protein, and about 65–90 wt-% aldehyde starch. The composition may be molded into articles which are biodegradable and have a high degree of tensile strength and water resistance.

The compositions are produced by (a) dissolving about 0.5–2 parts protein in about 2–6 parts of a solvent suitable for solubilizing the protein, preferably, an aqueous alcohol such as a 75% ethanol or methanol for zein and other like proteins with hydrophobic properties, or a mildly alkaline, aqueous solution (about pH 8) for soy protein and other like proteins; and (b) adding an amount of aldehyde starch, preferably about 2–8 parts, to effectively cross-link the starch and protein molecules together in the mixture to produce a biodegradable, water-resistant, cross-linked thermoplastic composition. The mixture is then dried to evaporate the solvent.

The compositions may be used to make extruded, molded, or pressure-formed articles. To facilitate molding of the composition, the residue may be remoistened with an effective amount of water, preferably to provide a water content of about 9–20%. The composition may be molded or shaped by conventional processing techniques, such as by extrusion, compression molding, injection molding, and the like. The remoistened residue may be mixed with other ingredients to facilitate molding of the composition into a shaped article, as for example, a plasticizing agent such as glycerol, a lubricating agent such as lecithin, an extender such as methylcellulose, an antioxidant such as butylated hydroxytoluene (BHT) and Irganox 1010, and the like.

Articles produced from the composition possess a smooth and shiny texture, a tensile strength of about 1.5–5 $kg/mm^2$, and a 24-hour water absorption at room temperature (about 25° C.) of about 2–35%. The tensile strength, percent elongation rate and water resistance of these articles is substantially higher than their counterparts made from native starch, or a native starch-protein thermoplastic. Advantageously, the present thermoplastics are biodegradable, and suitable for making disposable and/or edible articles such as food containers, tableware, and the like.

Surprisingly, it was found that the protein-starch thermoplastic compositions demonstrated an increasing tensile strength and water resistance with the increasing degree of oxidation of native, or natural, starch. It was also found that the inclusion of a plasticizer such as glycerol increases the flexibility of the article, but decreases the tensile properties and increases the water absorption of the formed article.

Although the articles made from the composition of the invention will degrade over time when exposed to moisture, such as from the atmosphere, the package contents, or from submersion in water or other direct contact with water, these articles possess a higher resistance to such degradation and will remain substantially intact for a more extended period of time than articles made from prior art starch-based thermoplastics. The high degree of crosslinking provided by the use of aldehyde starch eliminates the need for adding a separate crosslinking agent, such as formaldehyde or epoxide, to achieve a water-resistant starch-based thermoplastic.

DETAILED DESCRIPTION OF THE INVENTION

The thermoplastic compositions of the invention are prepared by reacting together effective amounts of protein and aldehyde starch in a compatible solvent. The resulting crosslinked starch-protein compositions possess a high degree of tensile strength and low water absorbance.

Although it is not meant to limit the scope of the invention, it is believed that the aldehyde groups on the starch molecule react with hydroxyl (—OH) groups of the protein and other starch molecules to form hemiacetal and acetal crosslinkages, with the amine (—$NH_2$) groups of the protein to form imine crosslinkages, and with thiol (—SH) groups of the protein molecule to form thiol cross-linkages. The crosslinkages by the formation of covalent bonds enhances the tensile properties and water resistance capabilities of the resulting plastics. Advantageously, the use of starch aldehydes in this way eliminates the need for additional crosslinking agents in the mixture which would normally be required for the manufacture of a water-resistant plastics produced from starch and protein.

As used herein, unless otherwise noted, the wt-% of the components of the composition are based on the total dry weight of the composition.

Proteins. Natural starches and modified starches are greatly affected by water which may cause rapid disintegration of the plastics. The composition of the present invention contains an amount of protein effective to provide a molded article having a level of structural stability and water resistance such that the article, when exposed to water, such as from humid air or from direct contact with water, will remain essentially intact without significant deterioration for a period of at least about 24 hours preferably about 48 to 72 hours, more preferably about 14 days.

Suitable proteins that may be used to form the composition of the invention include proteins capable of being externally linked to the aldehyde starch molecule. Preferably, the protein component is a water-resistant, or hydrophobic, protein.

The protein component may be derived from plants, animals and/or microorganisms. Suitable plant-derived proteins include, for example, zein, soybean protein, glutenin, hordein, kafirin, avenin, and the like. Animal-derived proteins that are suitable for use in the present composition include, for example, casein derived from milk, albumin derived from blood or egg, collagen, gelatin, keratin, and other like protein-containing substances. Microorganisms, such as beer yeast and baker's yeast, among other organisms, may also be used in the present compositions.

Aldehyde starch. An "aldehyde starch" is a starch which is oxidized to convert its anhydroglucose units to an aldehyde form. It was found that the tensile strength and water resistance of the present starch protein compositions increases with the increasing level of starch oxidation of native starch to an aldehyde form. The aldehyde starch has a level of oxidation effective for covalently binding the starch and protein molecules of the mixture to form starch-to-starch crosslinks and starch-to- protein crosslinks. The amount of aldehyde starch included in the composition is effective to provide a tensile strength of about 1.5–5 kg/mm$^2$, preferably about 3–4 kg/mm$^2$, and a level of water resistance such that the water absorption of the composition and/or molded article, submersed in water at room temperature (about 25° C.) over a 24 hour period is about 2–35%, preferably about 10–20%.

The level of oxidation and amount of starch included in the composition is effective to achieve an amount of crosslinking of the starch and protein molecules wherein an article produced from the composition has an effective level of water resistance and mechanical strength for its intended purpose. For example, compositions made with an aldehyde starch having a high level of oxidization of about 75–95%, preferably about 80–90%, are useful for providing articles having a low level of water absorption (24 hours, 25° C.) of about 2–15%, preferably about 2–5%, and high amount of tensile strength of about 3–5 kg/mm$^2$, preferably about 4–5 kg/mm$^2$. Such a composition may be used for producing articles that are exposed to water, for example, from moisture in the air, or being in direct contact with water, such as wet or moist package contents, over an extended period of time (i.e., 8 hours to 5 days). However, an article made with a highly oxidized aldehyde starch can be expensive due to the high cost of the starch material.

It was surprisingly found that starches having a low level of oxidation of about 1–50%, provide an effective amount of crosslinking of the protein and starch molecules to provide a composition with a level of tensile strength of about 1.5–4 kg/mm$^2$, preferably about 3–4 kg/mm$^2$, and a water absorption (24 hours, 25° C.) of about 10–40%, preferably about 10–20%. Such compositions comprise a starch having an oxidation level of about 1–50%, preferably about 5–30%, preferably about 10–20%, and are useful for producing articles that are exposed to low to moderate amounts of water, or water over a short period of time (i.e., 3–5 hours), as for example, pen or pencil casings, clay pigeons, golf tees and other similar sporting equipment, disposable plates, and the like.

Aldehyde starches are commercially available, for example, as polymeric aldehyde starch from Sigma Chemical Company, St. Louis, Mo., which possesses a starch oxidation of about 90–95%. Aldehyde starch may also be prepared by modifying a natural, or native, starch by the oxidation reaction of the starch with an oxidizing agent such as sodium metaperiodate, bromine, chlorine, hypochlorite, and the like, with sodium metaperiodate preferred, according to the method of Mehltreeter, Cl. L., "Sodium Metaperiodate Oxidation of Corn Starch," pages 316–317, in R. L. Whistler, ed., *Methods in Carbohydrate Chemistry*, Vol. 4 (1964), the disclosure of which is incorporated by reference herein. The amount of oxidizing agent used may be adjusted to achieve a desired amount of oxidation of the starch material. For example, about 162 grams (dry weight) corn starch may be reacted with about 100ml, 500ml and 900ml of a 0.11 M solution of sodium metaperiodate to provide an aldehyde starch having a low level of starch oxidation, respectively, of about 1%, 5% and 9%.

Suitable starches which may be modified and used according to the invention include those derived, for example, from corn including maize, waxy maize and high amylose corn; wheat including hard wheat, soft wheat and durum wheat; rice including waxy rice; and potato, rye, oat, barley, sorghum, millet, triticale, amaranth, and the like. The starch may be a normal starch (about 20–30 wt-% amylose), a waxy starch (about 0–8 wt-% amylose), or a high-amylose starch (greater than about 50 wt-% amylose).

A preferred composition prior to molding, comprises about 10–35 wt-% protein, preferably about 20–30 wt-%, more preferably about 25 wt-%, and about 65–90 wt-% aldehyde starch, preferably about 70–80 wt-%, more preferably about 75 wt-%, based on the total dry weight of the composition.

Other Additives

Plasticizers. Preferably, the composition before molding may include about 9–20% water to provide a plasticizing effect to facilitate processing, preferably about 9–11 wt-% water for compression molding, or up to about 20 wt-% water for extrusion or injection molding. According to the invention, the molded article will contain about 4–5 wt-% water. In addition to water, a minor but effective amount of a compatible plasticizer may also be included in the composition to facilitate processing and increase flexibility of the molded article.

It has been found that inclusion of a plasticizer such as glycerol, tends to increase flexibility, but decrease the tensile strength and increase the water absorption of the molded article. Therefore, it is preferred that, where desired, the composition include a minor amount of plasticizer of about 0.1–10 wt-%, preferably about 0.5–3 wt-%, based on the total solids weight of the composition. For extrusion and injection molding, the composition may include up to about 15 wt-% plasticizer.

Plasticizers that may be used according to the invention, alone or in combination, include low molecular weight hydrophilic organic compounds such as di- or polyhydric alcohols and derivatives thereof, as for example, glycerol, glycerol monoacetate, diacetate or triacetate, polyglycerol, glycerol monostearate, sorbitol, sorbitan, mannitol, maltitol, ethylene glycol, diethyl glycol, propylene glycol, polyvinyl alcohol, and the like; sodium cellulose glycolate, cellose methyl ether, and the like; sodium diethysuccinate, triethyl citrate, and the like; and polyalkylene oxides such as polyethylene glycols, polypropylene glycols, polyethylene propylene glycols, polyethylene glycol fatty acid esters, and the like. Preferred plasticizers according to the invention are glycerol, glycerol monoacetate, glycerol monostearate, and polyglycerol.

Lubricants. The composition may further contain a minor but effective amount of a lubricating agent to provide a mold- or dye-lubricating effect when the composition is molded into the desired article, for example, by aiding in the release of the molded article from the mold, to facilitate extrusion, and the like. Water-insoluble lubricants may also increase the water-resistance of the products. Examples of suitable lubricants that may be used in the compositions, either alone or in combination with another lubricant, include mono- and diglycerides, and fatty acids, preferably saturated fatty acids; phospholipids such as lecithin; phosphoric acid-derivatives of the esters of polyhydroxy compounds; vegetable oil, preferably hydrogenated forms; animal lipids, preferably hydrogenated forms to prevent thermal oxidation; and petroleum silicone and mineral oils. The amount of lubricant contained in the composition is preferably about 2 wt-% or less, more preferably about 0.1–1 wt-%, based on the total solids weight of the composition.

Extenders. Extenders, for example, water soluble polysaccharides such as methylcellulose, hydroxymethylcellulose, microcrystalline cellulose and cellulose fiber, and synthetic polymers such as poly(acrylic acids), poly(methacrylic acids), poly(vinyl acetates), poly(vinyl alcohol), and poly(vinyl acetate phthalate), may also be included in the composition. Preferably, an extender is included in the composition in an amount of about <50 wt-%, more preferably about 3–20 wt-%, based on the total solids weight of the composition.

Preservatives. A compatible antimicrobial agent such as a fungicide or bactericide may also be included in the composition in an amount effective to prevent growth of fungi, bacteria and the like, in or on the compositions or an article formed from the compositions. The antimicrobial agent should not induce undesirable interactions or chemical reactions between the components of the composition.

Antioxidants. The compositions may include a compatible antioxidant to retard oxidation and darkening of color of the composition during processing, such as by extrusion or molding at elevated temperatures. Suitable antioxidants include, for example, butylated hydroxyanisole (BHA), butylated hydroxytoluene (BHT), Irganox 1010, propyl gallate (PG), α-tocopherol (Vitamin E), and ascorbic acid preferably in the form of ascorbyl palmitate, and the like. The composition may include about 0.001–1% of an antioxidizing agent, preferably about 0.01–1%, preferably about 0.1–0.5%.

Colorants. The compositions may further include a coloring agent. Coloring agents, suitable for use in the present compositions include, for example, azo dyes such as Bismarck Brown 2R and Direct Green B; natural coloring agents such as chlorophyll, xanthophyll, carotene, and indigo; and metallic oxides such as iron or titanium oxides. The coloring agent may be included in the composition at a concentration of about 0.001 to 10 wt-%, preferably about 0.5 to 3 wt-%, based on the total solids weight of the composition.

Edible Compositions. The present thermoplastic compositions may be comprised entirely of ingredients that may be consumed at nontoxic levels by a human or other mammal. In that case, the article formed from the composition would be biodegradable as well as edible by a mammal. An edible composition according to the present invention, would comprise, for example, the starch aldehyde and protein combined with a compatible and edible solvent such as an aqueous alcohol or mildly alkaline aqueous solution (pH 8), and optional additives including, for example, a plasticizing agent such as glycerol, a lubricating agent such as lecithin and mono-or di-glycerides, an extender such as microcrystalline cellulose or cellulose fiber, an antioxidant such as ascorbic acid, and/or an antimicrobial agent such as methylparaben. An effective amount of an edible flavoring agent such as cocoa, vanillin, fruit extracts such as strawberry and banana, and the like, may also be included to enhance the taste of an edible composition. The composition may also be nutritionally reinforced, as for example by the inclusion of vitamins or minerals. The composition may also be ground and/or pelletized and used as animal feed.

Preparation of Thermoplastic Compositions and Formed Articles.

The starch-protein compositions are prepared by solubilizing the protein in a suitable solvent, and combining the solvent containing the protein with an effective amount of aldehyde starch to crosslink the starch and protein molecules in the composition.

About 0.5–2 parts protein, preferably about 0.8–1.5 parts, more preferably about 1 part, is combined with about 2–6 parts solvent, preferably about 3–5 parts, more preferably about 4 parts. Solvents that may be used according to the invention include aqueous alcohols (70– 80%) such as methanol, ethanol, isopropanol, n-propanol, butanol, and the like effective for solubilizing hydrophobic proteins such as zein, gliadin, hordein, and the like, preferably a 75% ethanol or methanol; or a weak alkaline, aqueous solution of about pH 7.5–8.5, preferably about pH 8, prepared, for example, with sodium or potassium chloride, sodium or potassium hydroxide, and the like, effective for solubilizing proteins such as soybean protein, glutenin, and the like.

The protein is allowed to react with the solvent, preferably with stirring, for a time effective to dissolve in solution. The mixture may also be heated to about 70°–80° C. to accelerate solubilization. It is understood that the time required for solubilization of the protein in the solvent will vary depending, for example, on temperature, the type and amount of protein, the solvent used, and the amount of mechanical stirring. The solvent containing the dissolved protein is then combined with about 1-8 parts aldehyde starch preferably about 2-6 parts, more preferably about 3 parts.

The mixture is then dried, as for example, at room temperature in a fume hood, in a convection oven at about 40°-50° C., and the like, to substantially evaporate the solvent. The resulting thermoplastic composition is composed of about 10-35 wt-% protein, preferably about 20-30 wt-%, more preferably about 25 wt-%, and about 65-90 wt-% aldehyde starch, preferably about 70-80 wt-%, more preferably about 75 wt-%. The dried residue may be further processed, as for example, by crushing or grinding the residue into a powder, granules and the like.

The resulting plastics possess an increased level of tensile strength, percent elongation rate and water resistance compared to their counterparts which are made from native starch, or protein/native starch mixture. The products have a smooth and shiny texture due, at least in part, to the high degree of crosslinking between starch and protein molecules. The present thermoplastic compositions and articles produced from those compositions, possess a high level of tensile strength of about 1.5-5 kg/mm$^2$, preferably about 3-4 kg/mm$^2$, and a low 24-hour water absorption at 25° C. of about 2-35%, preferably about 10-20%.

To facilitate molding of the composition into a shaped article, the dried residue may be remoistened with an effective amount of water to provide a moisture content of about 9-20%, more preferably about 10-15%. Optionally, the composition may be extruded using conventional methods known and used in the art, with or without heating into a rod shape and granulated into chips. To facilitate processing by extrusion, the residue may be combined with an effective amount of water to provide a water content of about 9-20%, and other additives such as a plasticizer, lubricating agent, extender, and the like.

The aldehyde starch-protein compositions of the present invention may be formed into a desired article according to conventional processing techniques known in the art for molding thermoplastic materials. For example, the composition may be shaped by compression molding wherein direct pressure is applied using a hydraulic press on an amount of the composition contained in a cavity; by injection molding wherein an amount of the plastic composition in melted form is forced into a mold and maintained under pressure until cool; by blow molding wherein a tube of the thermoplastic composition is extruded into a mold and air pressure is applied to the inside of the tube to conform it to the mold and form a hollow article; and by other methods such as rotation molding, transfer molding, extrusion molding, vacuum forming, pressure forming, and inflation molding.

The compositions may be molded to provide articles of varying shapes, sizes and dimensions, that are useful in a variety of applications. For example, the composition may be molded into an article such as a sheet, film, capsule, tray, tubing, or the like. The composition of the invention may be molded or extruded to provide foamed products such as packaging, loose fills, and the like. Residual water in the composition may be suitably used as a blowing agent. The articles may be used for packaging another article or substance such as foods, drugs and the like, that contain moderate amounts of water. As a further example, the compositions may be molded into dishware such as a plate, flatware such as a knife, fork or other eating utensil, or other like articles.

The compositions of the invention are useful for providing articles that are biodegradable with a high degree of water-resistance, so that the article will remain structurally intact for an extended period of time upon exposure to water. Although the articles made from the composition of the invention will degrade over time when exposed to moisture, such as from the atmosphere, the package contents, or from submersion in water or other direct contact with water, the articles have a higher resistance to such disintegration and will remain substantially intact for a more extended period of time than articles made from other starch-based thermoplastics, particularly those made of native starch, a starch-protein mixture, or a starch-polyvinyl alcohol (PVA) mixture.

Apart from being biodegradable, the compositions may be comprised entirely of components that are edible by a mammal including humans, or other animal, so that articles molded from such compositions may be safely consumed by the animal. Such edible compositions would be useful for making, for example, a packaging article that may be consumed by the user along with the package contents, dishes and flatware that may be ingested following a meal, a food article for consumption by a human or other animal such as a snack food or a domestic pet or other animal food, or other articles where consumption of the article is desired. After use, dishes or flatware may be collected, ground, pelletized, and reused as animal feed.

The invention will be further described by reference to the following detailed examples. These examples are not meant to limit the scope of the invention that has been set forth in the foregoing description. It should be understood that many variations and modifications may be made while remaining within the spirit and scope of the invention. The disclosure of the cited references are incorporated by reference herein.

EXAMPLE 1

Zein/Dialdehyde Starch (90% oxidized) Thermoplastic Composition

An alcohol/zein mixture was prepared by dissolving 1 part by weight of zein (Freeman, Tuckahoe, N.Y.) in 120 milliliters of 75% aqueous methanol at room temperature (25° C.). With continuous mixing, 3 parts by weight of polymeric dialdehyde starch (Sigma, St. Louis, Mo. being about 90% oxidized, was added to the zein/alcohol mixture. The polymeric dialdehyde and zein mixture was spread into an aluminum foil-lined glass baking dish and set in a fume hood for 2 hours allowing the methanol to evaporate. The mixture was then dried in a forced air oven at 50° C. for 16-18 hours. The resulting cake was ground in an electric mill (UDY Corp., Fort Collins, Colo.).

The granular product was adjusted to a moisture of approximately 9% and compression molded in molds designed to produce a standard Type I tensile bar (ASTM standards D638-86). For molding, 16 grams of mixture was placed into the mold cavity (16mm length, 19mm width), and leveled with a spatula. Filling temperature of the mold was $\leq 40°$ C. A pressure of 6500 psi was applied for 10 minutes using a Wabash molding machine. Molding temperatures examined were 127°, 135° and 140° C. The mold was then cooled to 60° C. before the specimens were removed.

After equilibrating ≧40 hours at 50% relative humidity, the mechanical properties of the specimens were tested by using an Instron Model 4502 system (Park Ridge, Ill.). Tests were performed following the Standard Test Method for Tensile Properties of Plastics (ASTM D638-86). Water absorption was measured following a modified standard test method (ASTM D570-81). Using the broken specimens from tensile testing, the bars were conditioned in a convection oven for 24 hours at 50° C. After weighing, the pieces were submerged in distilled water for 24 hours at room temperature (25° C.), blotted dry and reweighed. The specimen was then redried and weighed again to determine the loss of any soluble material. The 24 hour weight gain with a correction of soluble loss was the water absorption value. The composition was brown in color with a high amount of water resistant over a 24-hour period. After 24 hours of submersion in distilled water at 25° C., some specimens only absorbed 2.6% water. The specimens retained their physical shape and had high mechanical strength.

The effects of molding temperature on the mechanical properties of the material are shown in Table 1, below.

TABLE 1

| Molding Temp °C. | T.S. kg/mm$^2$ | Elong. % | W.A. % | Sol. loss % |
|---|---|---|---|---|
| 127 | 4.17 | 4.27 | 3.86 | 1.18 |
| 135 | 3.88 | 3.98 | 5.28 | 2.20 |
| 140 | 2.37 | 3.15 | 6.28 | 1.66 |

EXAMPLE 2

Thermoplastic Composition of Dialdehyde Starch (90% oxidized) with varying amounts of Zein Tensile bars were mixed and molded as described in Example 1, but with different ratios of zein to polymeric dialdehyde. Specimens were prepared in the following proportions of zein to polymeric aldehyde starch: 1:9, 1:4, 1:2, and 1:1. The mechanical properties of articles formed from the compositions are shown in Table 2, below.

TABLE 2

| Zein % | T.S. kg/mm$^2$ | Elong. % | W.A. % | Sol. loss % |
|---|---|---|---|---|
| 10 | 3.51 | 3.97 | 4.46 | 0.6 |
| 20 | 5.00 | 4.28 | 2.57 | 0.0 |
| 33 | 3.07 | 3.94 | 13.86 | 2.6 |
| 50 | 3.68 | 4.72 | 19.62 | 0.0 |

EXAMPLE 3

Thermoplastic Composition of Dialdehyde Starch (90% oxidized) and Zein with a plasticizing agent Tensile bars were prepared as described in Example 1, in the following proportions: 1 part zein, parts polymeric dialdehyde starch and 0.25 parts glycerol. The glycerol was added to the dissolved zein prior to addition of the starch to the mixture. Glycerol produced no benefit in strength of the specimens produced due to its hygroscopic nature. The mechanical properties of an article formed from the composition are shown in Table 3, below.

TABLE 3

| Zein % | Molding Temp. °C. | T.S. kg/mm$^2$ | Elong. % | W.A. % |
|---|---|---|---|---|
| 20 | 135 | 3.3 | 3.21 | 7.94 |

EXAMPLE 4

Thermoplastic Composition of Zein and Dialdehyde Starch with varying amounts of oxidation Corn starch was oxidized with 0.11 M sodium metaperiodate to produce dialdehyde starch according to the procedure of Mehltreeter, in Methods in Carbohydrate Chem., Vol. 4, R. L. Whistler (ed) (1964). The amount of sodium metaperiodate was adjusted to produce various degrees of oxidation (e.g., mole ratio (mole/mole) periodate/anhydroglucose unit of 0.017, 0,033 and 0.05).

Zein (1 part) was added to methanol (75% wt./vol.) and dissolved. Starch (3-7 parts) was folded into the solution to form a dough-like mixture. The dough was spread into foil lined glass dishes and dried overnight in the oven at 50° C. The dried material was ground and the moisture adjusted between 9-11%.

The powdery material was compression molded in molds designed to produce a tensile bar. Compression molding was conducted between 108° C. and 130° C. at 6500 psi. Tensile strength was measured on the Instron Testing Machine (ASTM method (D638-86) and the broken tensile bars were used for water absorbance testing (ASTM method D570-81).

Differences in properties produced by the lower degree of oxidation and varied mixture proportions are given in Table 4, below.

TABLE 4

| Prot. % | Starch Oxidation % | T.S. kg/mm$^2$ | Elong. % | W.A. % |
|---|---|---|---|---|
| 25 | 0 | 1.85 | 2.3 | 42.6 |
| 25 | 1 | 2.08 | 2.5 | 26.9 |
| 25 | 5 | 2.20 | 2.8 | 26.5 |
| 25 | 9 | 1.96 | 2.0 | 29.6 |

EXAMPLE 5

Thermoplastic Composition of Zein and Dialdehyde Starch with varying amounts of oxidation and a plasticizing agent The effect of oxidation on tensile strength in compositions containing a plasticizing agent, glycerol, was examined. Tensile bars were prepared as described in Example 4, except 5% by weight glycerol (0.25 part) was mixed into the protein solution.

All specimens had a ratio of zein to dialdehyde starch of 1:4 and were molded at a temperature of 118° C. Corn starch without modification (i.e., oxidation), zein and glycerol were also mixed in the same proportions as a control.

The mechanical properties of articles formed from the composition are shown in Table 5, below.

TABLE 5

| Protein % | Starch Oxidation % | T.S. kg/mm$^2$ | Elong. % | W.A. % |
|---|---|---|---|---|
| 20 | 0 | 1.39 | 1.58 | 58.1 |
| 20 | 3 | 1.56 | 2.00 | 41.7 |

TABLE 5-continued

| Protein % | Starch Oxidation % | T.S. kg/mm² | Elong. % | W.A. % |
|---|---|---|---|---|
| 20 | 6.7 | 2.18 | 1.67 | 34.0 |
| 20 | 10 | 1.98 | 2.30 | 38.3 |

EXAMPLE 6

Thermoplastic Composition of Zein/Dialdehyde Starch (90% oxidized) and an antioxidizing agent Zein and polymeric dialdehyde were prepared as in Example 1, but with the addition of 1% by weight antioxidant, Irganox 1010 (CIBA-GEIGY, Hawthorne, N.Y.) or butylated hydroxytoluene (BHT), following the grinding step. (Irganox 1010 is tetrakis(methylene (3,5-di-tert-butyl-4-hydroxyhydrocinnamate)) methane pentaerythritol tris ester with 3-(3,5,Di,Tert,-Butyl-4-hydroxyphenyl) propionic acid (impurity)). Mold temperature was 135° C. and the moisture content was 9%. The mechanical properties of articles formed from the compositions are shown in Table 7, below.

TABLE 6

| Antioxidant (%) | T.S. kg/mm² | Elong. % | W.A. % |
|---|---|---|---|
| Irganox 1010 20% | 4.32 | 3.54 | 5.7 |
| BHT 20% | 5.08 | 3.76 | 5.8 |

What is claimed is:

1. A biodegradable thermoplastic composition, comprising:
   (a) about 10–35 wt-% protein, the protein being capable of being externally linked to an aldehyde starch molecule; and
   (b) about 65–90 wt-% aldehyde starch having a starch oxidation effective to covalently bind to the protein to produce a biodegradable, water-resistant cross-linked thermoplastic composition having a tensile strength of about 1.5–5 kg/mm², and a 24-hour water absorption at 25° C. of about 2–35%; wherein the starch oxidation of the aldehyde starch is about 75–95%.

2. The composition according to claim 1, where the starch oxidation of the aldehyde starch is about 80–90%.

3. The thermoplastic composition according to claim 1, comprising about 20–30 wt-% protein and about 70–80 wt-% aldehyde starch.

4. The thermoplastic composition according to claim 1, wherein the protein is a plant-derived protein selected from the group consisting of zein, soybean protein, glutenin, hordein, kafirin, avenin, or a combination thereof.

5. The composition according to claim 1, wherein the protein is an animal-derived protein selected from the group consisting of collagen, casein, albumin, gelatin, keratin, or a combination thereof.

6. The composition according to claim 1, wherein the protein is derived from a microorganism selected from the group consisting of beer yeast, baker's yeast, or a combination thereof.

7. The thermoplastic composition according to claim 1, further comprising about 0.5–1 wt-% antioxidizing agent.

8. The thermoplastic composition according to claim 1, further comprising about 9–20 wt-% water.

9. The thermoplastic composition according to claim 8, comprising about 9–10 wt-% water.

10. The composition according to claim 1, further comprising a minor but effective amount of a plasticizer.

11. The composition according to claim 10, wherein the plasticizer is a polyhydric alcohol selected from the group consisting of glycerol, glycerol monoacetate, diacetate or triacetate, polyglycerol, glycerol monostearate, sorbitol, sorbitan, mannitol, maltitol, ethylene glycol, propylene glycol, polyvinyl alcohol, sodium cellulose glycolate, cellulose methyl ether, sodium alginate, sodium diethysuccinate, triethyl citrate, polyethylene glycols, polypropylene glycols, polyethylene propylene glycols, and a combination thereof.

12. The composition according to claim 11, wherein the plasticizer is glycerol, polyglycerol, glycerol monostearate, sorbitol, sorbitan, mannitol, maltitol, ethylene glycol, propylene glycol, or polyvinyl alcohol, or a combination thereof.

13. The thermoplastic composition according to claim 1, further comprising an effective amount of a coloring agent.

14. A biodegradable article formed from a thermoplastic composition according to claim 1.

15. The biodegradable article according to claim 14, being formed by injection molding, compression molding, transfer molding, extrusion molding, vacuum molding, rotation molding, or expanded foam molding.

16. A biodegradable thermoplastic composition, comprising: (a) about 10–35 wt-% protein, the protein being capable of being externally linked to an aldehyde starch molecule; and (b) about 65–90 wt-% aldehyde starch having a starch oxidation effective to covalently bind to the protein to produce a biodegradable, water-resistant cross-linked thermoplastic composition having a tensile strength of about 1.5–5 kg/mm², and a 24-hour water absorption at 25° C. of about 2–35%; wherein the starch oxidation of the aldehyde starch is about 1–50%.

17. The composition according to claim 16, wherein the starch oxidation of the aldehyde starch is about 10–30%.

18. A biodegradable, thermoplastic composition produced by the process of:
   (a) dissolving about 0.5–2 parts protein in about 2–6 parts of a compatible, solubilizing solvent; and
   (b) reacting together the solvent-protein mixture with about 2–8 parts aldehyde starch having a starch oxidation effective to produce a cross-linked, biodegradable, water-resistant, thermoplastic composition containing about 10–35 wt-% protein and about 65–90 wt-% aldehyde starch.

19. The thermoplastic composition according to claim 18, wherein the solvent is an aqueous ethanol, methanol, propanol, isopropanol, butanol, or a mixture thereof.

20. The thermoplastic composition according to claim 19, wherein the protein is zein, gliadin, hordein, or a mixture thereof.

21. The thermoplastic composition according to claim 18, wherein the solvent is an aqueous alkaline solution of about pH 7.5–8.5.

22. The thermoplastic composition according to claim 21, wherein the alkaline solution comprises sodium chloride, potassium chloride, sodium hydroxide, potassium hydroxide, or a mixture thereof.

23. The thermoplastic composition according to claim 19, wherein the protein is soybean protein, glutenin or a combination thereof.

24. The thermoplastic composition according to claim 18, wherein the aldehyde starch is prepared by reacting a starch derived from corn, wheat, rice, potato, rye, oat, barley, sorghum, millet, triticale, amaranth, or a combination thereof, with an effective amount of sodium metaperiodate, bromine, chlorine, or hypochlorite.

25. The thermoplastic composition according to claim 18, further comprising: (c) drying the cross-linked composition to a water content of about 9-20 wt-%.

26. A biodegradable article formed from a thermoplastic composition produced according to claim 18.

27. The biodegradable article according to claim 26, being formed by injection molding, compression molding, transfer molding, extrusion molding, vacuum molding, rotation molding, or expanded foam molding.

28. The biodegradable article according to claim 27, wherein the molding temperature is about 110°-125° C.

29. A method of making a biodegradable thermoplastic composition, comprising:
(a) dissolving about 0.5-2 parts protein in about 2-6 parts of a compatible, solubilizing solvent; and
(b) mixing together the solvent-protein mixture with about 2-8 parts aldehyde starch having a starch oxidation effective to produce a cross-linked, biodegradable, water-resistant thermoplastic composition containing about 10-35 wt-% protein solution and about 65-90 wt-% aldehyde starch.

* * * * *

UNITED STATES PATENT AND TRADEMARK OFFICE
CERTIFICATE OF CORRECTION

PATENT NO.   :   5,397,834
DATED        :   Mar. 14, 1995
INVENTOR(S)  :   Jane et al.

It is certified that error appears in the above-identified patent and that said Letters Patent is hereby corrected as shown below:

At column 9, line 60, after the word "zein," insert --3--.

At column 10, line 18, for "0,033" read --0.033--.

At column 11, line 45, for "where" read --wherein--.

Signed and Sealed this

Twelfth Day of September, 1995

Attest:

BRUCE LEHMAN

Attesting Officer      Commissioner of Patents and Trademarks